US00RE48180E

(19) United States
(12) Reissued Patent
Stokes et al.

(10) Patent Number: US RE48,180 E
(45) Date of Reissued Patent: Sep. 1, 2020

(54) SLEDGE HAMMER

(71) Applicant: Fiskars Finland Oy Ab, Helsinki (FI)

(72) Inventors: Steven Stokes, Fitchburg, WI (US); Aaron Honadel, Ixonia, WI (US); Colin Roberts, Madison, WI (US); Petteri Masalin, Helsinki (FI); Sami Lyytikäinen, Lohja (FI)

(73) Assignee: FISKARS FINLAND OY AB, Helsinki (FI)

(21) Appl. No.: 29/704,733

(22) Filed: Sep. 6, 2019

Related U.S. Patent Documents

Reissue of:
(64) Patent No.: Des. 770,257
Issued: Nov. 1, 2016
Appl. No.: 29/531,274
Filed: Jun. 24, 2015

U.S. Applications:
(62) Division of application No. 29/668,435, filed on Oct. 30, 2018, which is an application for the reissue of Pat. No. Des. 770,257.

(51) LOC (12) Cl. ..... 08-02
(52) U.S. Cl.
USPC ..... D8/75; D8/78
(58) Field of Classification Search
USPC ..... D8/75, 76, 77, 78, 79, 80, 81
(Continued)

(56) References Cited

U.S. PATENT DOCUMENTS 277,183 A 5/1883 Wright
755,355 A * 3/1904 Carlsen ..... B25D 1/00 254/26 R
(Continued)

FOREIGN PATENT DOCUMENTS

CN 301645716 8/2011
CN 3016457165 8/2011
(Continued)

*Primary Examiner* — Philip S Hyder
(74) *Attorney, Agent, or Firm* — Leason Ellis LLP

(57) CLAIM

We claim the ornamental design for a sledge hammer, as shown and described.

DESCRIPTION

Figure 1:
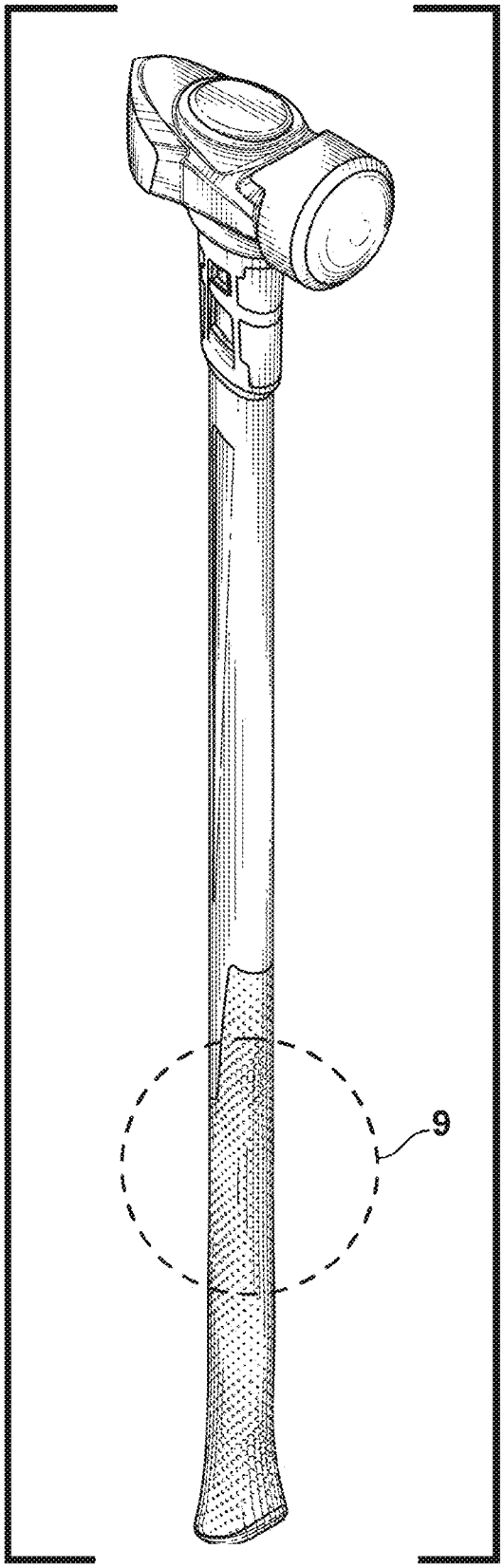
Figure 2:
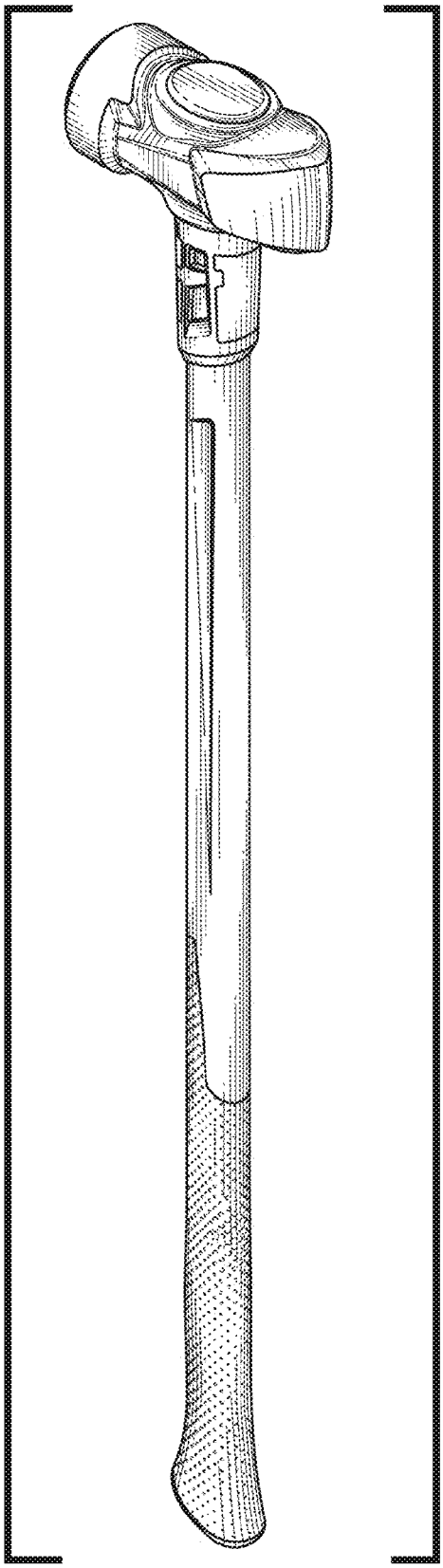
Figure 3:
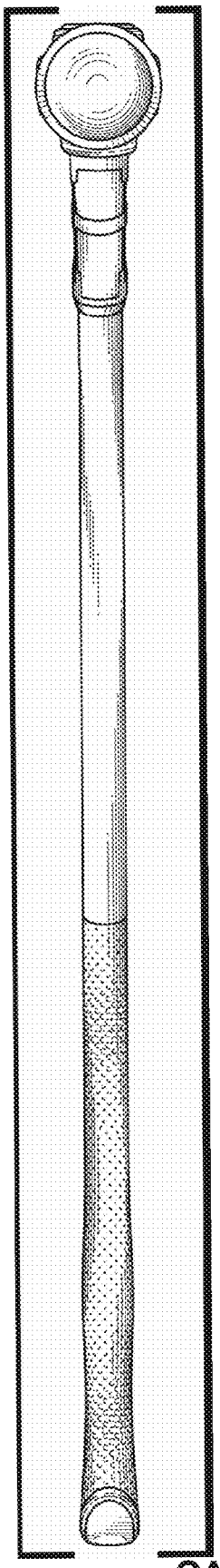
Figure 4:
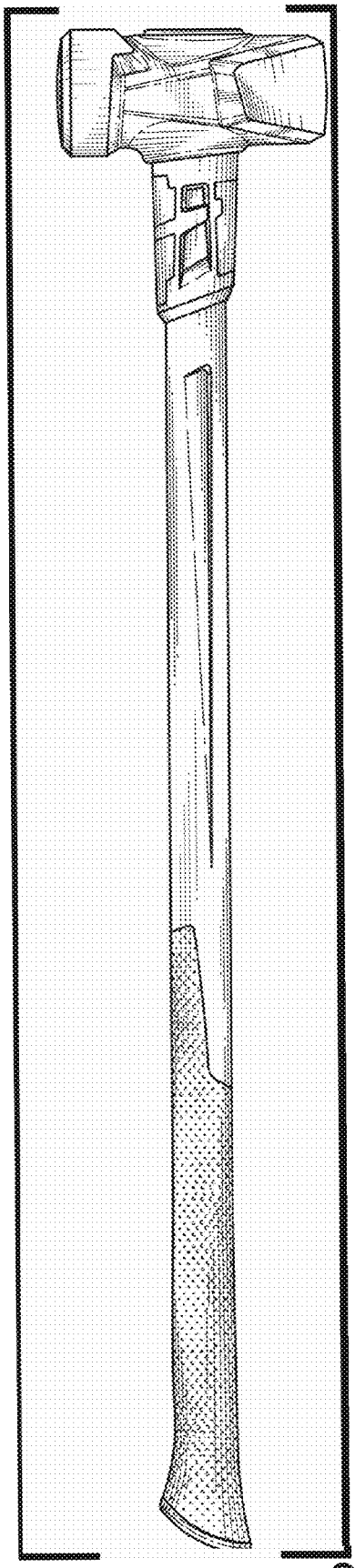
Figure 5:
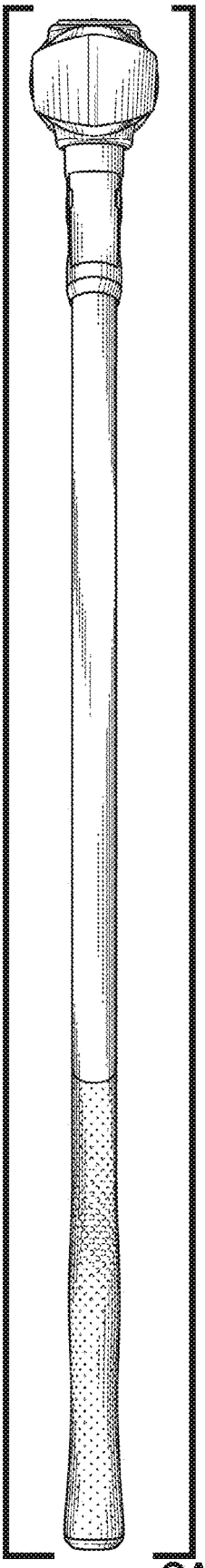
Figure 6:
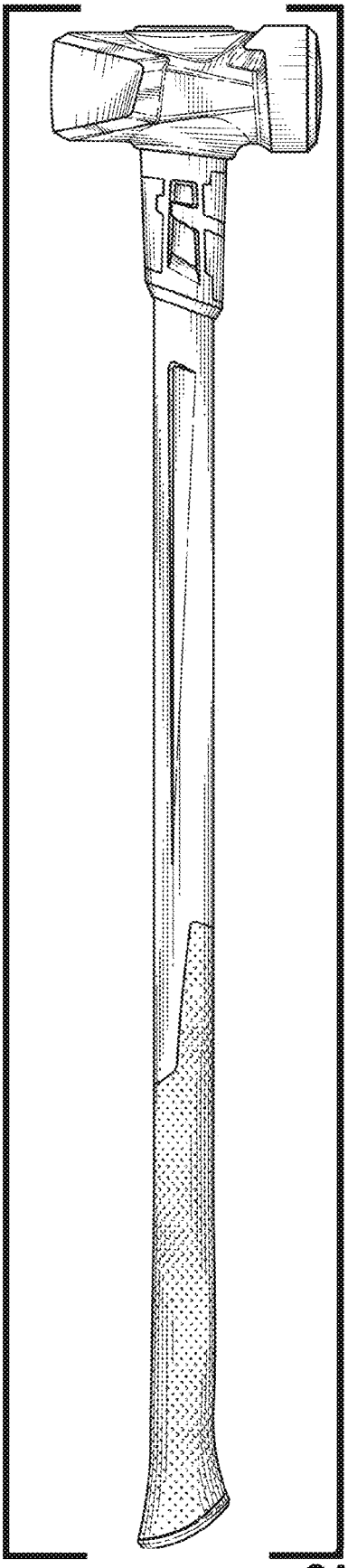
Figure 7:
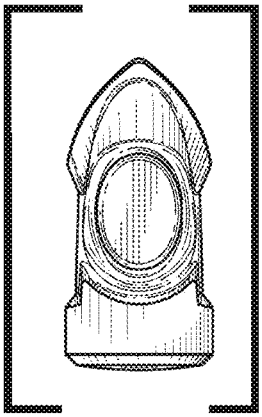
Figure 8:
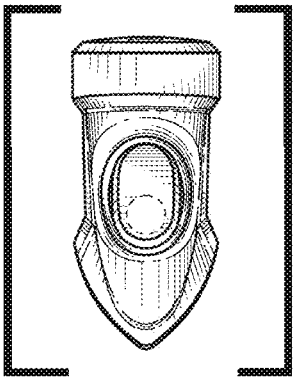
Figure 9:
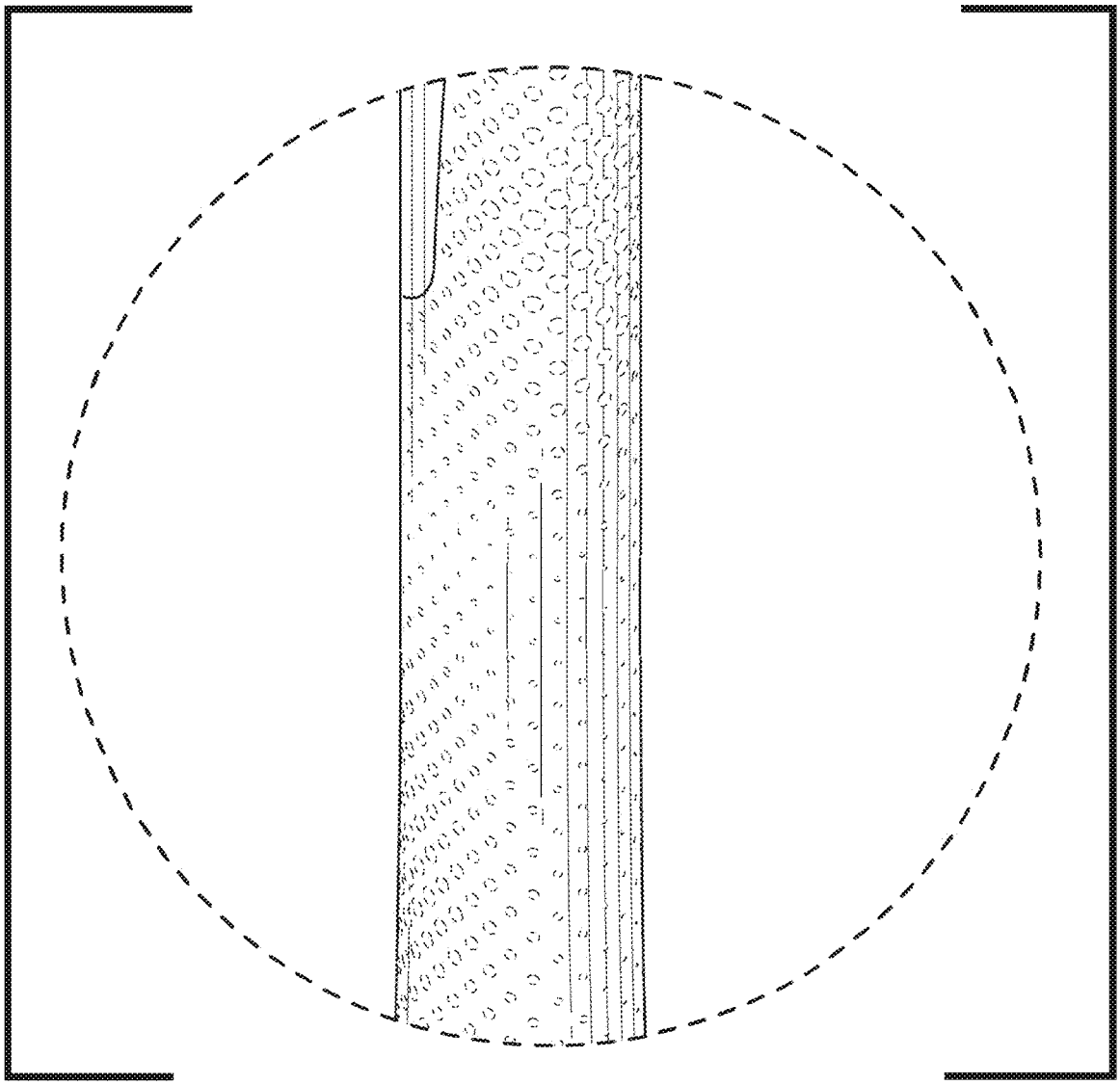

[FIG. 1 is a front perspective view from above of the claimed design according to one embodiment;]
[FIG. 2 is a rear perspective view from above of the claimed design of FIG. 1;]
[FIG. 3 is a front view of the claimed design of FIG. 1;]
[FIG. 4 is a left side view of the claimed design of FIG. 1;]
[FIG. 5 is a rear side view of the claimed design of FIG. 1;]
[FIG. 6 is a right side view of the claimed design of FIG. 1;]
[FIG. 7 is a top view of the claimed design of FIG. 1;]
[FIG. 8 is a bottom view of the claimed design of FIG. 1; and,]
[FIG. 9 is a detail view of a portion of the handle of the claimed design.]
*FIG. 10 is a front perspective view from above of the sledge hammer;*
*FIG. 11 is a rear perspective view from above of the sledge hammer of FIG. 1;*
*FIG. 12 is a front of the sledge hammer of FIG. 1;*
*FIG. 13 is a left side view of the sledge hammer of FIG. 1;*
*FIG. 14 is a rear view of the sledge hammer of FIG. 1;*
*FIG. 15 is a right side view of the sledge hammer of FIG. 1;*
*FIG. 16 is a top view of the sledge hammer of FIG. 1; and,*
*FIG. 17 is a bottom view of the sledge hammer of FIG. 1.*
Any portion of the article depicted in broken lines forms no part of the claimed design. [As shown in FIG. 9, the circular features on the grip of the handle are depicted in broken
(Continued)

NEW

NEW lines] *Broken lines formed of unequal length dashes (i.e., dash-dot) show boundaries between claimed and unclaimed portions of the design.*

1 Claim, 9 Drawing Sheets

Matter enclosed in heavy brackets [ ] appears in the original patent but forms no part of this reissue; matter printed in italics indicates the additions made by reissue.

(58) Field of Classification Search
CPC ... B25D 1/00; B25D 1/02; B25D 1/04; B25D 1/045; B25D 1/12; B25D 1/14; B25D 1/16; B25G 1/01; B25G 1/02; B25G 1/102
See application file for complete search history.

(56) References Cited

U.S. PATENT DOCUMENTS 935,253 A 9/1909 Gill et al.
1,008,944 A 11/1911 Brendel
1,102,935 A 7/1914 Lipoff
1,279,075 A 9/1918 Bali
1,321,371 A 11/1919 Huff
1,357,451 A 11/1920 Groover
1,369,499 A 2/1921 Thomson
1,377,920 A 5/1921 Pearson
D99,635 S 5/1936 Vaughan
D115,256 S 6/1939 Vaughan
2,319,253 A 5/1943 Neal
2,470,865 A 5/1949 Rosengren
2,504,093 A 4/1950 Toth
D256,322 S 8/1980 Zabarte
D263,369 S 3/1982 Kuo
D266,141 S 9/1982 Nannen
4,357,974 A 11/1982 Nannen
D271,076 S 10/1983 Hillinger
4,476,597 A 10/1984 Gobbi
D288,628 S 3/1987 Farrand
4,669,342 A 6/1987 Wilson
D302,381 S 7/1989 Zabarte
D302,933 S 8/1989 Zabarte
D303,208 S 9/1989 Chung
D340,177 S 10/1993 Key
D354,212 S 1/1995 Ronnholm et al.
D356,480 S 3/1995 Ronnholm et al.
D362,795 S 10/1995 Ronnholm
D365,739 S 1/1996 Weintraut
5,551,323 A 9/1996 Beere et al.
D378,656 S 4/1997 Maine
5,647,080 A 7/1997 Martin
D381,884 S * 8/1997 Spirer ..... D8/75
D393,776 S 4/1998 Kessler
D408,219 S 4/1999 Lai
D410,362 S 6/1999 Lai
D420,268 S 2/2000 Coonrad
D442,048 S 5/2001 Coonrad
D448,265 S * 9/2001 Chen ..... D8/107
D465,714 S 11/2002 Stump et al.
D468,181 S 1/2003 Hung
D494,830 S * 8/2004 Konen ..... D8/107
6,860,053 B2 3/2005 Christiansen
D519,348 S 4/2006 Chen
D519,813 S 5/2006 Hung
D520,568 S * 5/2006 DeBoer ..... D8/75
D521,344 S 5/2006 Hung
D521,839 S * 5/2006 Hung ..... D8/75
7,044,020 B2 5/2006 Rosenthal
D530,582 S * 10/2006 Sleiman ..... D8/77
D566,510 S 4/2008 Nielsen
7,380,483 B2 6/2008 Hu
D572,993 S * 7/2008 Baty ..... D8/11
D574,690 S * 8/2008 Chen ..... D8/77
D600,523 S 9/2009 Adams et al.
D605,922 S 12/2009 Reinius
7,631,582 B2 12/2009 Hu
D618,977 S * 7/2010 Ruhland ..... D8/77
D619,442 S * 7/2010 Chen ..... D8/80
D623,413 S 9/2010 Blanchard et al.
D625,982 S 10/2010 Oyama
D628,870 S 12/2010 Jerabek et al.
D628,871 S 12/2010 Jerabek et al.
7,874,231 B2 1/2011 Hanlon
D631,722 S 2/2011 Lamarre et al.
D636,185 S 4/2011 Behar et al.
D644,498 S 9/2011 Chen
D645,252 S 9/2011 Blanchard et al.
D648,202 S * 11/2011 Chen ..... D8/80
D648,610 S 11/2011 Paloheimo
8,056,443 B2 11/2011 Hanlon
D653,925 S 2/2012 Hung
D654,774 S * 2/2012 Mullen ..... D8/107
D657,566 S 4/2012 Behar et al.
D658,884 S 5/2012 Watanabe et al.
D661,170 S 6/2012 Beggs
D664,358 S 7/2012 Behar et al.
D670,504 S 11/2012 Watanabe et al.
D672,628 S * 12/2012 Frenkel ..... D8/78
D676,300 S 2/2013 Vanderbeek
8,387,486 B2 3/2013 Hanlon
D680,402 S 4/2013 Descombes
8,420,203 B2 4/2013 Sikora et al.
D685,247 S 7/2013 Tatic
8,770,548 B2 7/2014 Hanlon
D710,615 S 8/2014 Pereira et al.
D716,126 S 10/2014 Dahlberg et al.
D730,134 S 5/2015 Youngren et al.
D743,231 S 11/2015 Chang
D747,943 S 1/2016 Hung
D752,938 S 4/2016 West et al.
D752,941 S * 4/2016 Lee ..... D8/81
D758,820 S * 6/2016 Nelson ..... D8/80
2004/0244117 A1 12/2004 Huang
2007/0082750 A1 4/2007 Rose
2008/0072702 A1 3/2008 Arnold
2010/0199809 A1 8/2010 St. John et al.
2012/0048055 A1 3/2012 Krause et al.
2014/0260812 A1 9/2014 Chang
2014/0311299 A1* 10/2014 Chen ..... B25D 1/12 81/22
2016/0008966 A1* 1/2016 Stokes ..... B25G 1/01 81/22

FOREIGN PATENT DOCUMENTS

KR 3002221850000 6/1998
KR 300222185000 9/1998
TW D142581 9/2011
TW D148437 8/2012
TW D153006 4/2013

* cited by examiner

CANCELLED

CANCELLED

CANCELLED

CANCELLED

CANCELLED

CANCELLED

CANCELLED

CANCELLED

CANCELLED

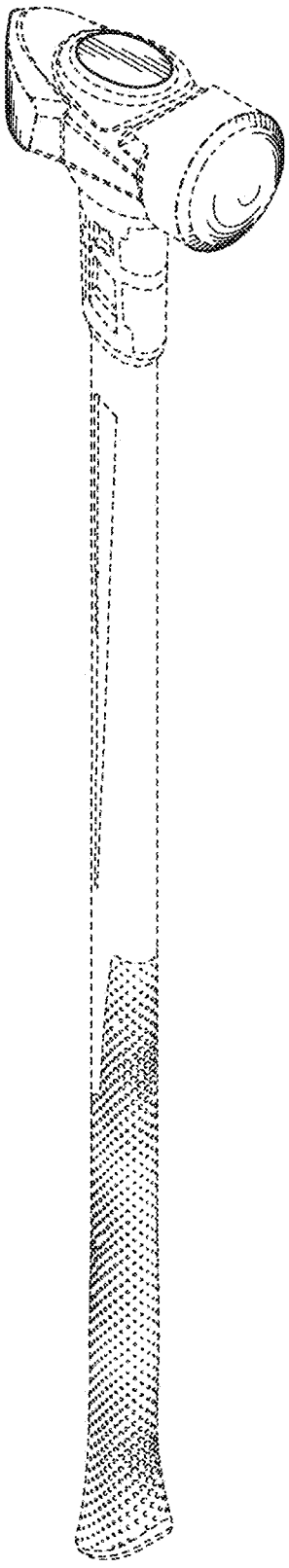
FIG. 10
NEW
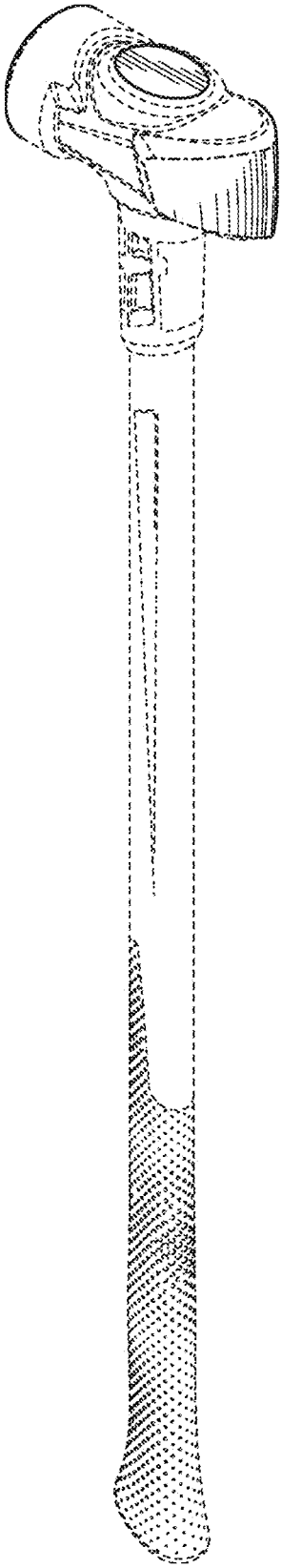
FIG. 11
NEW

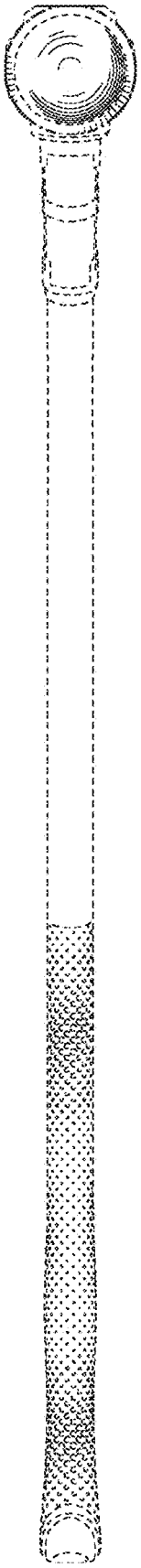
FIG. 12
NEW
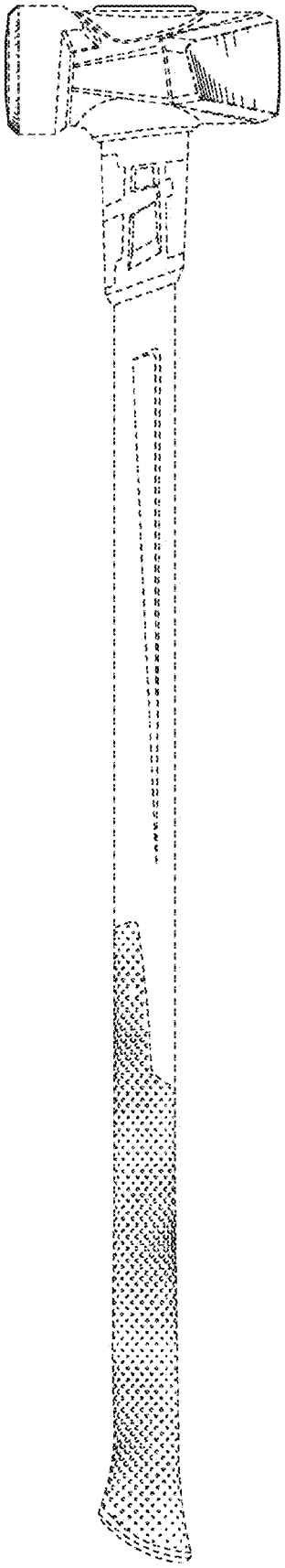
FIG. 13
NEW

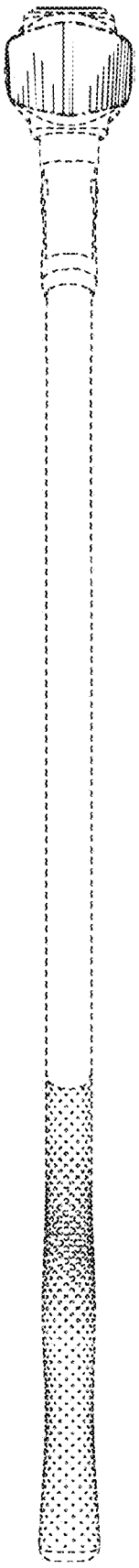
FIG. 14
NEW
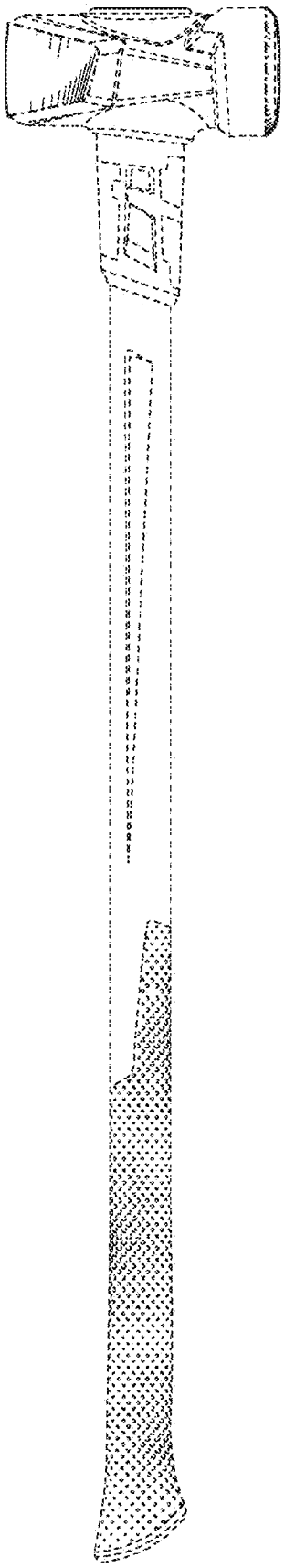
FIG. 15
NEW

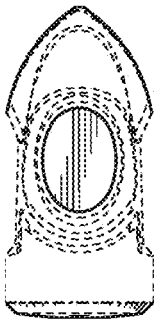
FIG. 16
NEW
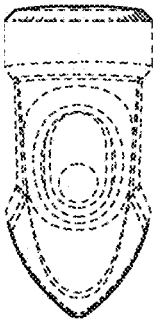
FIG. 17
NEW